A. T. BROWN.
OIL HEATED MELTING FURNACE.
APPLICATION FILED MAR. 9, 1910.
975,826.
Patented Nov. 15, 1910.
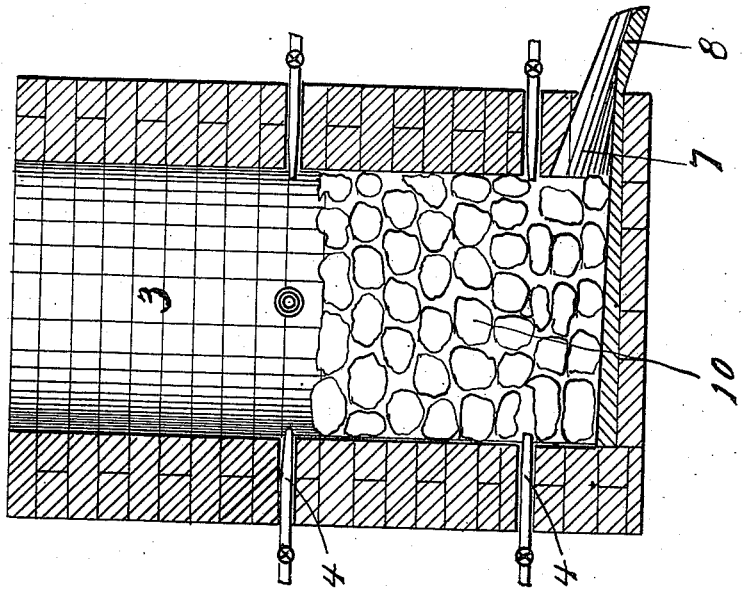
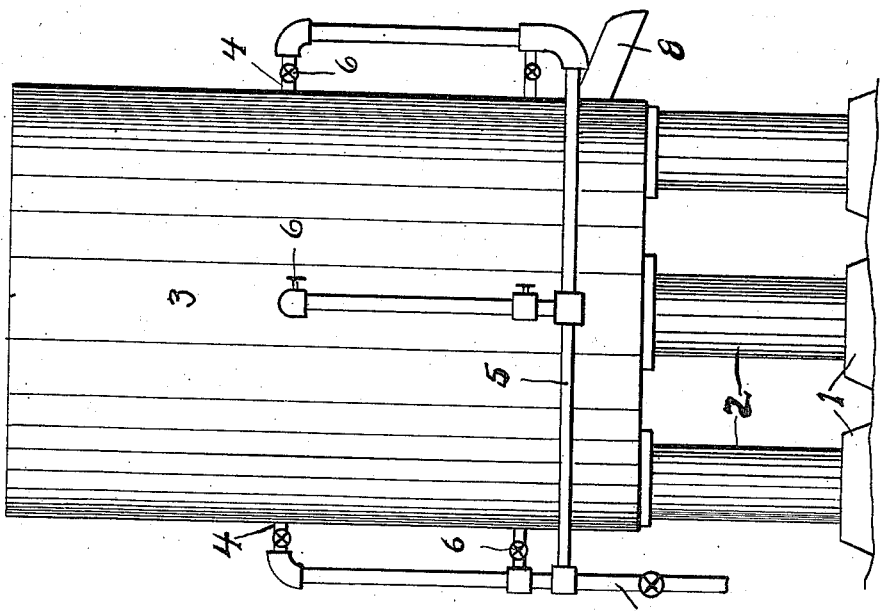
Witnesses.
Roswell P. Rogers
Eleanor R. Blake
Inventor.
Arthur T. Brown, by.
Carlos P. Griffin
Atty.

UNITED STATES PATENT OFFICE.

ARTHUR T. BROWN, OF SAN FRANCISCO, CALIFORNIA.

OIL-HEATED MELTING-FURNACE.

975,826.	Specification of Letters Patent.	Patented Nov. 15, 1910.

Application filed March 9, 1910. Serial No. 548,303.

*To all whom it may concern:*

Be it known that I, ARTHUR T. BROWN, being a citizen of the United States, residing at 66 Silver street, in the city of San Francisco and State of California, have invented a new and useful Oil-Heated Melting-Furnace, of which the following is a specification in such full and clear terms as will enable those skilled in the art to construct and use the same.

This invention relates to a melting furnace the object of which is to make use of oil burners in the melting of the materials in the furnace.

It will be understood by those skilled in the art that when a mass of metal, or ore, melts it settles down into a compact mass which prevents the passage therethrough of a gas flame and nothing remains to keep up the temperature of the mass to the melting point; the result is that the metal chills and hardens as soon as it has closed off the flame from the burner. This is the advantage of coke in such a furnace, the masses of coke each supplying heat and holding the body of metal open till it is heated enough to insure proper liquefaction. In this invention this object is attained by holding the mass of metal, or ore, open by means of refractory bodies through which the melted metal percolates, and from which it absorbs such additional heat as to make it liquid enough to remain liquid until removed from the furnace in the usual manner, the refractory bodies permitting the passage into the furnace of the flame from the burners, even when a considerable body of metal has percolated to the bottom of the furnace.

In the drawing, in which the same numeral of reference is applied to the same portion throughout the several views, Figure 1 is a side elevation of a furnace showing the fuel supply pipes, and Fig. 2 is a vertical sectional view showing the refractory bodies and the mass of material thereon ready for melting.

The numeral 1 is applied to the bases of the furnace legs 2 of which there are a suitable number to properly support the furnace 3, said furnace being of any desired size to suit the conditions under which it is to be operated.

Near the bottom of the furnace there are two series of oil burners 4 fed from supply pipes 5 and regulated by means of valves 6. To draw off the melted material a tap hole 7 is provided, said tap hole having a spout 8 to run the melted material away from the furnace.

The oil burners are placed in the furnace in two series, one near the bottom of the furnace and the other series some distance above the first series, the object being to provide a hot flame over a considerable area of the furnace. The bottom of the furnace is then filled with a considerable number of large refractory bodies 10 made of any desired refractory material, as fire clay. The burners are then started and the mass of material to be melted is placed on the top of said bodies; the upper set of burners melts the metal, and as said bodies and material are heated as hot as may be necessary to melt said material, the melted material runs down and absorbs additional heat from said bodies and passes down to the bottom of the furnace in a fluid state. In any event the amount of melted material in one run, metal or ore, will not be greater than is required to fill all the spaces between the bodies to the level of the first set of burners. Then as the material is drawn off at the tap hole the lowest of the bodies are again heated hot enough to melt any fresh material that may perculate down over them, the operations being repeated as long as the furnace is in use.

Having thus described my invention what I claim as new and desire to secure by Letters Patent of the United States is as follows:

1. In a melting furnace, a stack, a series of refractory bodies in said stack and having a considerable space there-around, a series of burners near the lower portion of the stack and adapted to heat said refractory bodies, a second series of burners above the first set and adapted to melt the material above said bodies, and a tap hole in said stack, as set forth.

2. In a melting furnace, a stack, a series of refractory bodies in said stack at the bottom thereof, a series of burners above the bottom of the stack and below the top of said refractory bodies, a second series of burners in said stack and above the top of said refractory bodies, and a tap hole in the bottom of said stack for the removal of the melted materials therefrom, as set forth.

In testimony whereof I have hereunto set my hand this 19 day of February A. D. 1910, in the presence of the two subscribed witnesses.

ARTHUR T. BROWN.

Witnesses:
A. K. DAGGETT,
C. P. GRIFFIN.